No. 712,770. Patented Nov. 4, 1902.
G. M. DAVIDSON.
WATER PURIFIER.
(Application filed Mar. 3, 1902.)
(No Model.) 2 Sheets—Sheet 2.
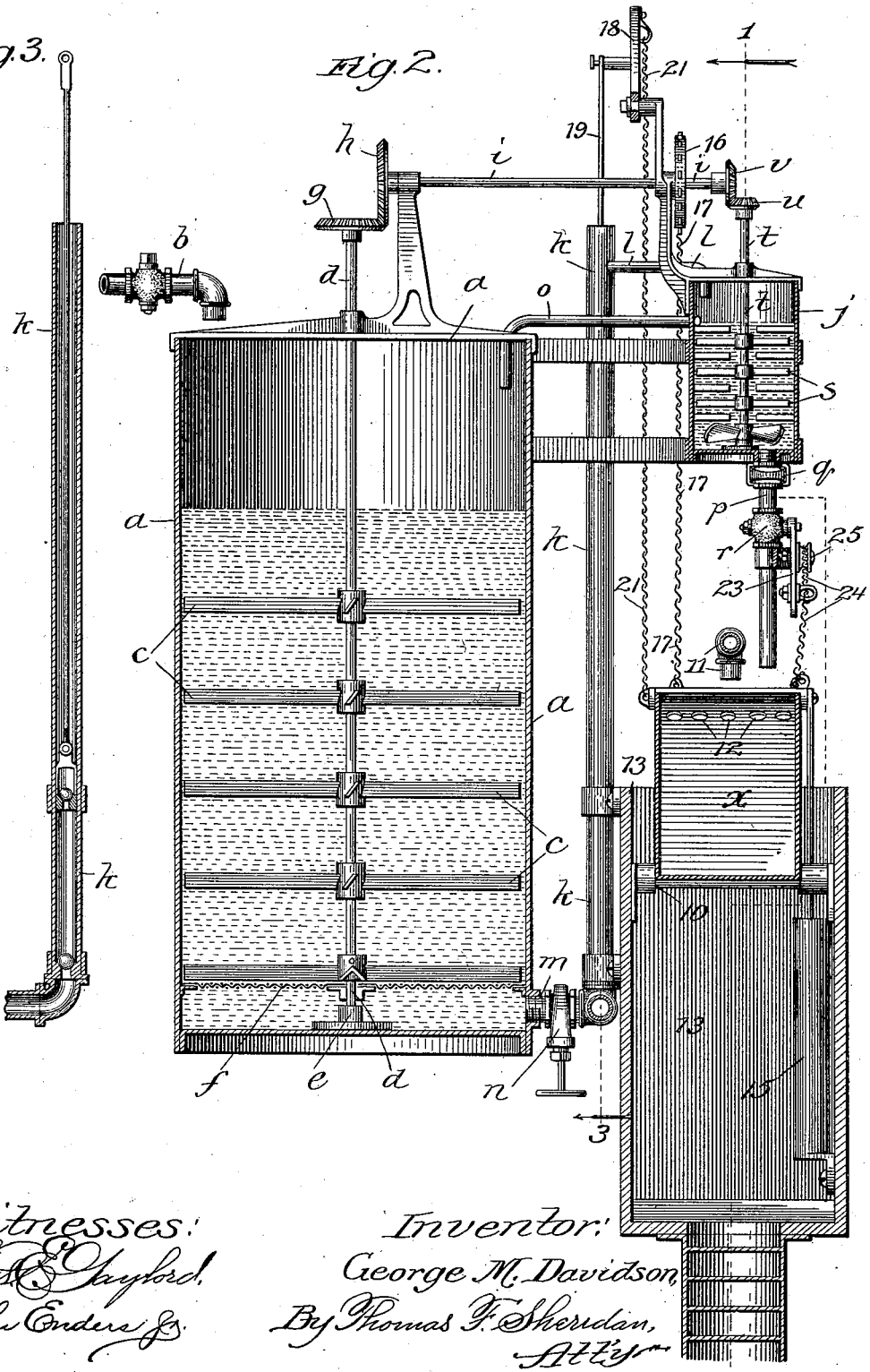
Witnesses:
Inventor:
George M. Davidson,
By Thomas F. Sheridan,
Att'y

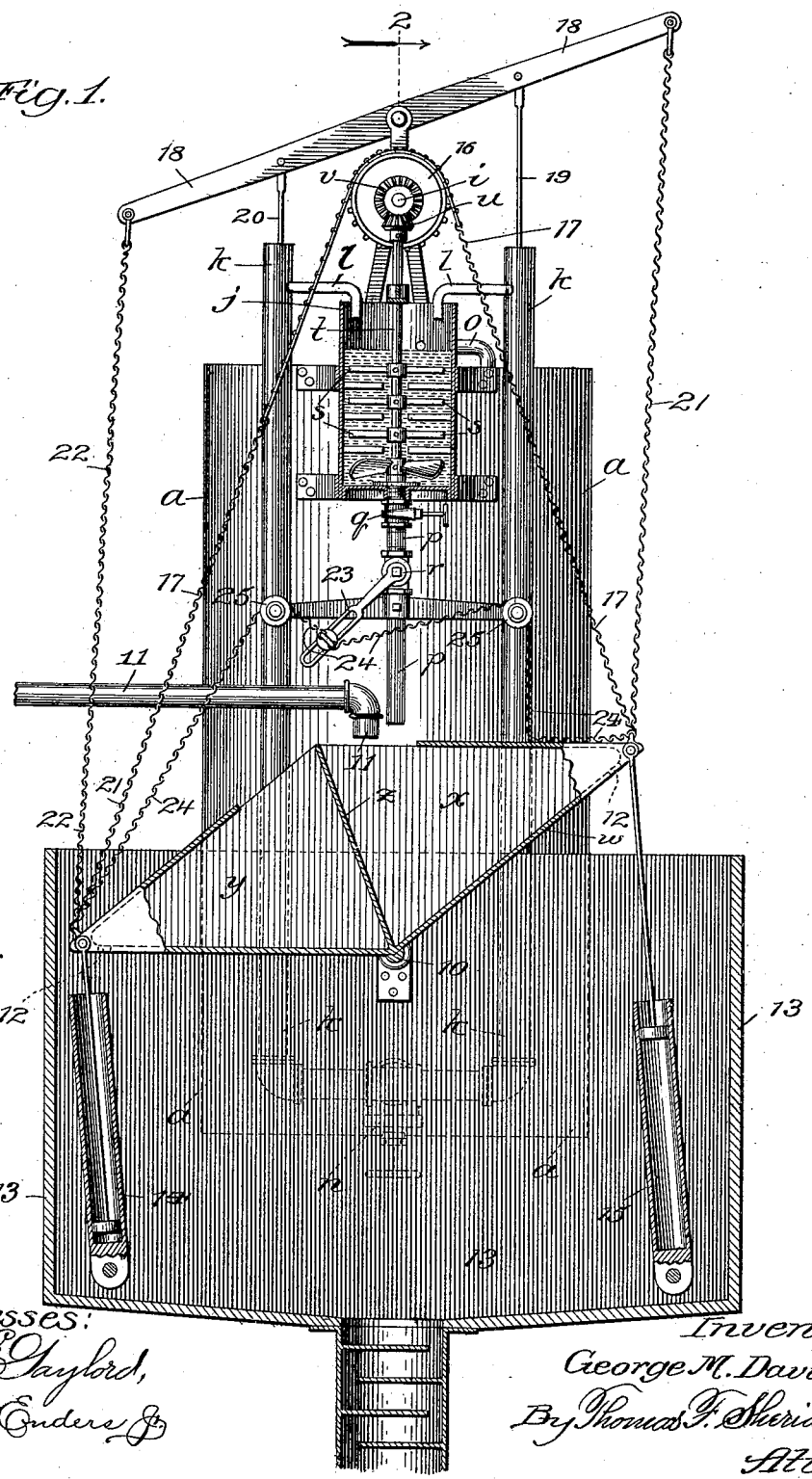

UNITED STATES PATENT OFFICE.

GEORGE M. DAVIDSON, OF OAKPARK, ILLINOIS.

WATER-PURIFIER.

SPECIFICATION forming part of Letters Patent No. 712,770, dated November 4, 1902.

Application filed March 3, 1902. Serial No. 96,491. (No model.)

*To all whom it may concern:*

Be it known that I, GEORGE M. DAVIDSON, a citizen of the United States, residing at Oakpark, in the county of Cook and State of Illinois, have invented certain new and useful Improvements in Water-Purifiers, of which the following is a specification.

This invention relates to that class of mechanisms known as "water-purifiers"—that is, apparatus or mechanisms arranged to mix predetermined quantities or proportions of chemicals with feed-water preliminary to the feeding of water to a steam-boiler, so as to largely minimize the deleterious action of ordinary waters during the generation of steam, all of which will more fully hereinafter appear.

The principal object of the invention is to provide a simple, economical, and efficient water-purifier.

A further object of the invention is to provide a water mixer and purifier with economical means for operating the different stirring, feeding, and mixing mechanisms.

Further objects of the invention will appear from an examination of the drawings and the following description and claims.

The invention consists principally in the combination of a chemical-feed tank, stirring mechanism movably mounted therein, a discharge-pipe in such chemical-feed tank, a water-supply pipe, and a tilting vessel arranged to receive the discharge of the water-supply and chemical-discharge pipes and connected with the operating mechanisms to operate the same by and during its movements.

The invention consists, further, in the combination of a chemical-mixing tank, a chemical-feed tank connected therewith and provided with a discharge-pipe, stirring mechanisms in the chemical mixing and feed tanks, a water-supply pipe, and a tilting vessel provided with a plurality of measuring mixing-chambers arranged to receive the discharge of the water-supply and chemical-discharge pipes and connected with the different stirring mechanisms in the chemical mixing and feed tanks to operate the same by and during its movements.

The invention consists, further and finally, in the features, combinations, and details of construction hereinafter described and claimed.

In the accompanying drawings, Figure 1 is a sectional elevation of an apparatus constructed in accordance with these improvements, taken on line 1 of Fig. 2 looking in the direction of the arrow; Fig. 2, a cross-sectional elevation of the same, taken on line 2 of Fig. 1 looking in the direction of the arrow; and Fig. 3, a sectional elevation of one of the pumps which connect the chemical-mixing tank with the chemical-feed tank.

In the art to which this invention relates it is well known that most water contains more or less incrusting solid matter in solution or other deleterious matter, which, if fed into steam-boilers, is during the generation of the steam generally deposited in the form of scale on the inner surface thereof, all of which acts to incrust the flues and crown-sheet and lessen the efficiency of the boiler as well as resulting in an extra consumption of fuel and decrease in the life of the boiler. It is also well known that a great many chemicals may be used and mixed with the feed-water before it enters the boiler to counteract the effects of said solids or other deleterious substances, so that the water when used will not have a deteriorating influence on the boiler.

The principal object, therefore, of this invention is to provide a suitable mixing apparatus—an apparatus which measures the chemicals and water in predetermined quantities and thoroughly mixes them before they enter the settling tank or tanks preliminary to being fed into the boiler, all of which will be more fully hereinafter set forth.

In constructing and arranging an apparatus in accordance with these improvements I provide a chemical-mixing tank $a$, of the desired size and shape, preferably cylindrical in contour and placed in a vertical position. This mixing-tank may be arranged underneath a chemical-supply pipe $b$, so that dissolved chemicals may be fed into it as desired—that is, chemicals which are first mixed in a vat and dissolved so as to form a preliminary chemical mixture. It is desirable that after these chemicals have been preliminarily or primarily mixed or dissolved they be more thoroughly mixed together while in the chemical-mixing tank $a$. To accomplish this result, I provide a set of stirrers or beaters $c$, mounted upon a rotatable shaft $d$, vertically arranged and practically coincident with the axis of the mixing-tank. This rotatable shaft at its lower end is mounted in a stepped block $e$ in the bottom of the tank, and its first set of blades, beaters, or stirrers is arranged just above a screen $f$, which acts to prevent the large particles entering the space below the same. The upper part of the rotatable stirrer-shaft is provided with a bevel-gear $g$, meshing with a second bevel-gear $h$ on a driving-shaft hereinafter more fully described.

In order to measure and feed the chemical solution, so that it may be mixed with the requisite quantity of water-supply and to maintain a proper head to insure the necessary uniform feed at all times, a chemical-feed tank $j$ is provided and connected with the chemical-mixing tank by means of pump mechanism $k$, the spouts $l$ of which are arranged directly over the opening in the chemical-feed tank. This pump mechanism is composed of pumps $k$, having a common inlet $m$ in the bottom part of the chemical-mixing tank directly under the screen, but has two spouts, one for each pump, arranged as above described. The single pipe connecting the pumps with the mixing-tank is provided with a gate-valve $n$, which may be opened or closed whenever desired. To maintain a constant or uniform "head" in the chemical-feed tank, it is provided with an overflow-pipe $o$, which leads back or returns the overflow to the chemical-mixing tank. This chemical-feed tank is provided with a discharge-pipe $p$, in which are arranged two valves—one a gate-valve $q$ and the other a rotary valve $r$, the gate-valve to open or close the discharge-pipe during an emergency—say for repair of the valve—while the rotary valve is provided as a means for measuring predetermined quantities of chemicals, as will more fully hereinafter appear. This chemical-feed tank is also provided with stirring or beating mechanism $s$, vertically arranged therein and upon a rotatable shaft $t$, the upper end of such shaft being provided with a bevel-pinion $u$, meshing with a bevel-pinion $v$ on the driving-shaft $i$ above described.

For the purpose of operating the mechanism above described, as well as for feeding and mixing the chemicals and feed-water together, a tilting water and chemical mixing vessel $w$ is provided, substantially diamond-shaped in side elevation and provided with two chambers $x$ and $y$, formed by a vertical transverse partition $z$. This tilting vessel is pivotally mounted at the lower apex 10 of the diamond, so that as one water-chamber is filled (the chamber $y$) it tilts the vessel to the position shown in Fig. 2, and when such chamber is emptied and the opposite one, $x$, filled the other end of the tilting vessel is depressed and the parts assume a position opposite to that shown in Fig. 1. This tilting vessel is arranged directly underneath the discharge-spouts of the chemical-feed tank and a water-supply pipe 11. It is also boxed completely, with the exception of at or near the upper central portion thereof, as shown, particularly in Fig. 1, where such chambers are open to receive the water and chemicals, the result being that during the tipping of the vessel there is very little splash and the vessel may be operated slower, and in this manner a more uniform mixture is obtained. The ends of the vessel, or, in other words, the apex of the water-chamber and the lower walls thereof, are provided with a plurality of discharge-openings 12, so that when the vessel occupies the position shown in Fig. 1 the mixed water and chemicals will flow out therefrom in a uniform manner and into a settling-tank 13, thus giving the other chamber sufficient time to be filled before starting the return movement. When the tilting vessel is operating, particularly when one side is emptied and the other full of liquid, it would be apt to cause more or less of a shock or jar when it reaches its limit of motion. In order to prevent such a shock or jar, two dash-pots 14 and 15 are provided, one connected with each end of the tilting vessel, as shown in Fig. 1. This not only acts to prevent a shock or jar, but provides for an easy or uniform motion of the tilting vessel and enables it to better accomplish its other functions as well as its mixing and discharging functions.

It is highly desirable in this class of mechanisms that means for moving the stirring or beating mechanisms, pumping mechanism, and the chemical-measuring valve be operated as economically as possible and with the simplest kind of mechanisms, for the reason that a great number of these devices will have to be used on the large railroad systems of the country, and the economy thereof should be seriously considered; otherwise the improvements are not likely to be used to any great extent. In order, therefore, to provide a simple as well as efficient means for operating these mechanisms, I prefer to take advantage of the power developed by and during the operations of the tilting measuring and mixing vessel. In order so to do, I provide the driving-shaft above alluded to with a sprocket-wheel 16, around which is passed a sprocket-chain 17, connected to each end of the tilting vessel, as shown in the drawings. It will thus be seen that during the tilting operations this driving-shaft is tilted first in one direction and then in the other and the beating or stirring mechanism above described operated. To operate the pump mechanism, a "walking-beam" 18 is provided, each side of the center of which is pivotally connected with the pump-rods 19 and 20 and each end by means of the chains 21 and 22 with the extreme ends of the tilting vessel, so that during the tilting operations of such vessel the pumps are alternately operated and a supply of chemical mixture furnished the chemical-feed tank. The rotary measuring-valve r is provided with a slotted lever-arm 23, to which is adjustably secured a chain 24, in turn connected with each end of the tilting vessel, as shown in Fig. 1, and passed over idlers 25. By this arrangement it will be seen that as the vessel tilts from one side to the other the rotary valve is operated by the movement of its lever-arm 23 from one side to the other and the valve opened and closed alternately or successively to supply the requisite amount of chemicals to the mixing vessel.

It will be noted that a supply of water through the water-supply pipe may be constantly furnished—though not, perhaps, at a uniform pressure or volume—and that the peculiar measuring vessel insures a constant uniform supply of the mixture of feed-water and chemicals, for the reason that the tilting vessel cannot operate until one side is emptied, or substantially so, and the other side filled with the predetermined amount of water before it can be operated, thus providing for a uniform mixture.

I claim—

1. In a water-purifier, the combination of a chemical-mixing tank, a chemical-feed tank connected therewith and provided with a discharge-pipe, stirring mechanism in the chemical mixing and feed tanks, a water-supply pipe, and a tilting vessel provided with a plurality of measuring mixing chambers arranged to receive the discharge of the water-supply and chemical-feed pipes and connected with the stirring mechanisms in such tanks to operate the same by and during its movements, substantially as described.

2. In a water-purifier of the class described, the combination of a chemical-mixing tank provided with stirrer or beater mechanism, a chemical-feed tank provided with stirring mechanism and a discharge-pipe, pump mechanism connecting the chemical mixing and feed tanks together, a water-supply pipe, a tilting vessel provided with a plurality of measuring and mixing chambers arranged under the openings of the chemical-discharge and water-supply pipes, and means connecting the stirring and pump mechanisms with the tilting vessel to operate the same by and during the movements of the tilting vessel, substantially as described.

3. In a water-purifier of the class described, the combination of a chemical-mixing tank provided with stirrer and beater mechanism, a chemical-feed tank provided with stirring mechanism and a discharge-pipe, pump mechanism connecting the chemical mixing and feed tanks together, a water-supply pipe, a tilting vessel provided with a plurality of measuring and mixing chambers arranged under the openings of the chemical-discharge and water-supply pipes, a measuring-valve in the chemical-discharge pipe, and means connecting the tilting vessel with the stirring and pump mechanism and with the measuring-valve in the chemical-discharge pipe to operate the same by and during the movements of the tilting vessel, substantially as described.

4. In a water-purifier of the class described, the combination of a chemical-feed tank, a water-supply pipe, and a diamond-shaped tilting water-measuring and chemical-mixing vessel arranged underneath the same and provided with two chambers substantially entirely closed having receiving-openings adjacent to the water-supply and chemical-discharge pipes and at or near the upper central portion thereof and discharging-openings at or near the extreme ends of the tilting vessel, substantially as described.

5. In a water-purifier of the class described, the combination of a chemical-mixing tank, a chemical-feed tank provided with a discharge-pipe, a measuring-valve in such discharge-pipe, pump mechanism connecting the chemical mixing and feed tanks together, stirring mechanism in the chemical mixing and feed tanks geared together, a tilting vessel provided with a plurality of measuring and mixing chambers arranged underneath the openings of the chemical-supply and water-discharging pipes, and chain mechanism connecting such tilting vessel with the gearing of the stirring mechanisms, the pump mechanism and the measuring-valve to operate the same at and during the movements of the tilting vessel, substantially as described.

6. In a water-purifier of the class described, the combination of a chemical-mixing tank, a chemical-feed tank provided with a discharge-pipe, a measuring-valve in such discharge-pipe, pump mechanism composed of two reciprocating pumps connecting the chemical mixing and feed tanks together, stirring or beating mechanism in such stirring and mixing tanks geared together, a "walking-beam" connected with both of the pumps to operate the same, a tilting vessel provided with a plurality of measuring and mixing chambers arranged underneath the openings of the water-supply and chemical-discharging pipes, and chain or similar mechanisms connecting the ends of the tilting vessel with the walking-beam of the pump mechanism, the gearing of the stirring mechanisms and the measuring-valve of the chemical-discharge pipe to operate the same by and during the movements of such tilting vessel, substantially as described.

7. In a water-purifier of the class described, the combination of a chemical-mixing tank, a chemical-feed tank provided with a discharge-pipe, a measuring-valve in such discharge-pipe, pump mechanism composed of two reciprocating pumps connecting the chemical mixing and feed tanks together, stirring or beating mechanism in such chemical mixing and feed tanks geared together, a "walking-beam" connecting both of the pumps together to operate the same, a tilting vessel provided with a plurality of measuring and mixing chambers arranged underneath the openings of the water-supply and chemical-discharging pipes, chain or similar mechanisms connecting the ends of the tilting vessel with the "walking-beam" of the pump mechanism, the gearing of the stirring mechanism and the measuring-valve of the chemical-discharge pipe to operate the same by and during its movements, and dash-pot mechanism connected with the tilting vessel to modify its operations, substantially as described.

GEORGE M. DAVIDSON.

Witnesses:
THOMAS F. SHERIDAN,
HARRY IRWIN CROMER.